Sept. 2, 1969    F. H. TENNIS    3,464,444
PILOT CONTROLLABLE VALVE MECHANISM
Original Filed Oct. 19, 1967    4 Sheets-Sheet 1

Francis H. Tennis

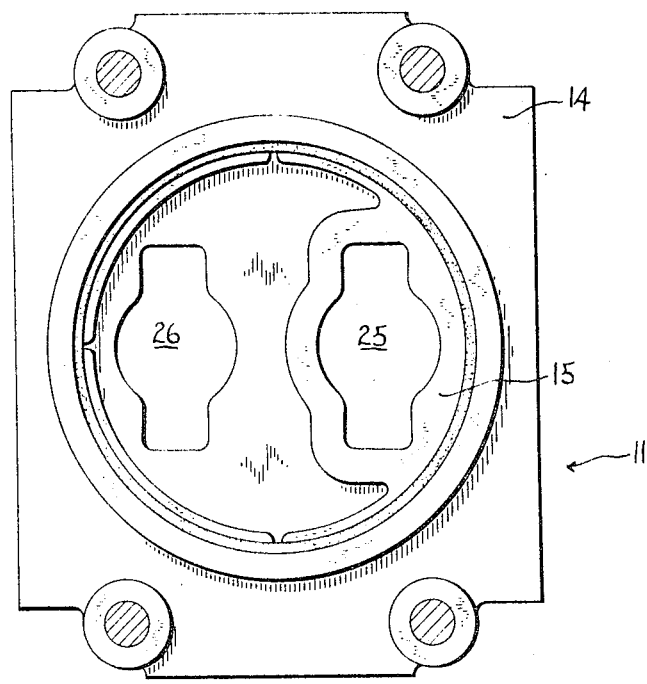
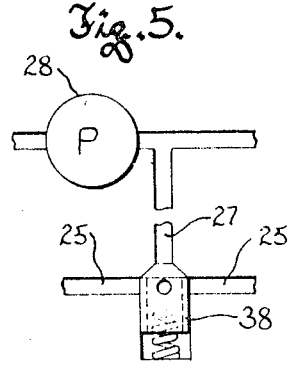

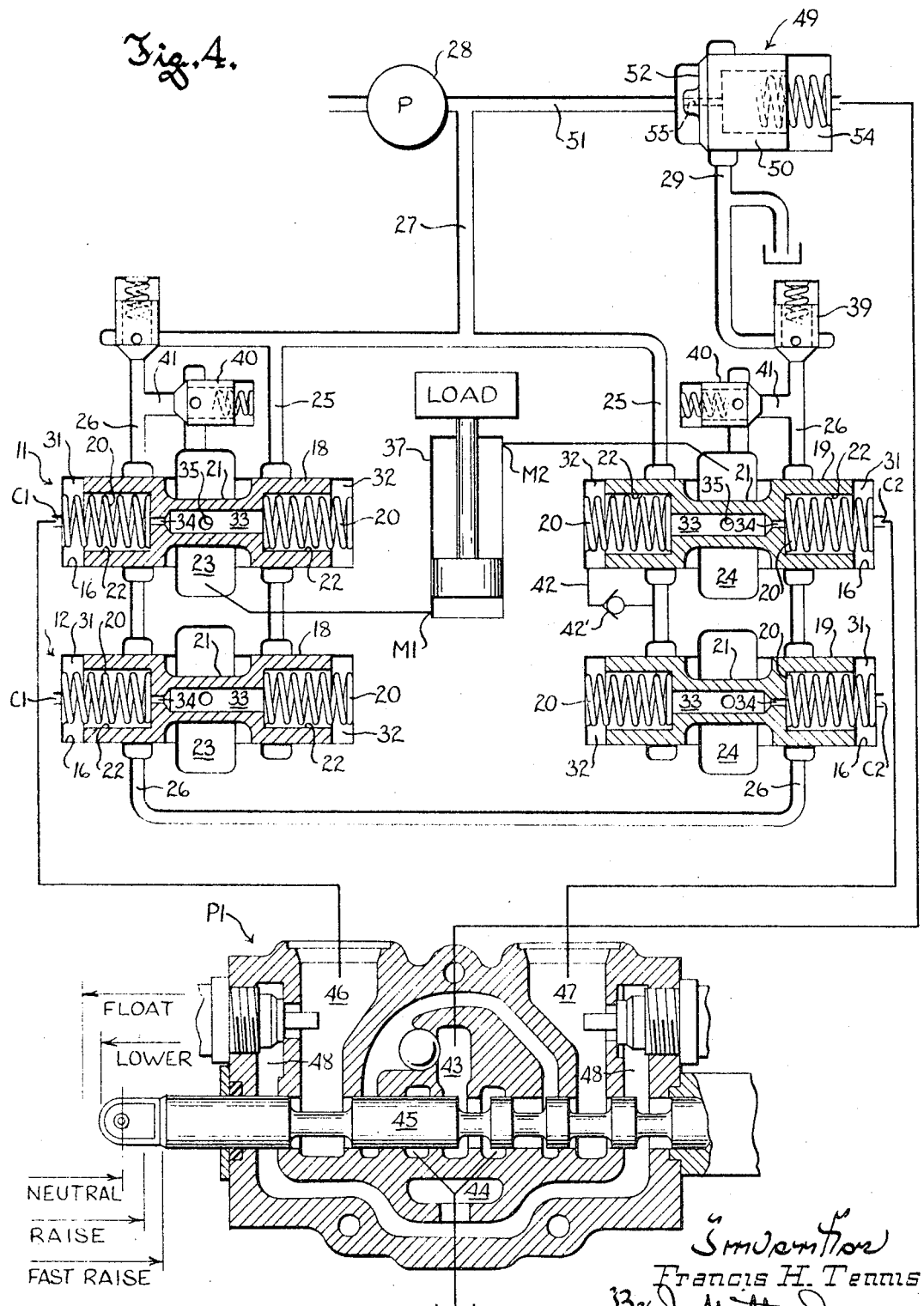

United States Patent Office 3,464,444
Patented Sept. 2, 1969

3,464,444
PILOT CONTROLLABLE VALVE MECHANISM
Francis H. Tennis, Oconomowoc, Wis., assignor to Koehring Company, Milwaukee, Wis., a corporation of Wisconsin
Original application Oct. 19, 1967, Ser. No. 676,547. Divided and this application Nov. 29, 1968, Ser. No. 780,028.
Int. Cl. F15b 13/02
U.S. Cl. 137—596.12
19 Claims

ABSTRACT OF THE DISCLOSURE

Admittance of pressurized control fluid to a first pressure chamber effects movement of a spool type valve element to a feed position at which it directs pump output fluid to a service passage for flow to a controlled motor; while admittance of return pressure fluid from the controlled motor to a second pressure chamber effects movement of the valve element to a vent position at which it directs return fluid from the motor to an exhaust outlet for flow to a reservoir.

---

This invention relates to control valve mechanisms for fluid pressure operated systems, and has more particular reference to improvements in axially slidable spool type control valves like those disclosed in my copending application Ser. No. 676,547, filed Oct. 19, 1967, of which this application is a division.

The primary purpose of the invention is to provide a spool type control valve which features a degree of simplicity and compactness heretofore unattainable with conventional spool valves and which, as a result, can be produced at considerably lower cost.

The spools of control valves for reversible fluid motors were heretofore constructed so that each spool of the valve could direct pressure fluid to either port of the fluid motor and at the same time vent the other motor port. As a result, the spools and the valve bodies containing them had to be quite lengthy, and the spools were often difficult to shift because of warpage of the valve bodies containing them.

It is an object of this invention, however, to provide what might be generally termed a divided spool type control valve which departs radically from the conventional in that each spool of the valve comprises a pressure actuatable plunger that controls fluid flow to and from only one port of a fluid motor. From this, it will be seen that for control of a reversible fluid motor, a control valve of this invention requires a pair of independent but cooperating substantially short spools, one for each of the two ports of the motor; while one such spool will suffice for control of a single acting motor.

Another purpose of the invention resides in the provision of a control valve featuring a pressure responsive valve spool which is held in a neutral position as long as a single pilot control port therefor is blocked, and which spool is actuatable to either feed or vent positions depending upon whether pressure fluid is admitted to or exhausted from its control port.

Still another purpose of the invention is to provide a control valve mechanism featuring a valve spool that can also serve as a load holding check valve, making it possible to eliminate conventional load holding check valves.

With these observations and objects in mind, the manner in which the invention achieves its purpose will be appreciated from the following description and the accompanying drawings.

This disclosure is intended merely to exemplify the invention. The invention is not limited to the particular structure disclosed, and changes can be made therein which lie within the scope of the appended claims without departing from the invention.

The accompanying drawing illustrates several complete examples of the physical embodiment of the invention constructed according to the best modes so far devised for the practical application of the principals thereof and in which:

FIGURE 3 is a face view of one of the control valve sections;

FIGURE 4 is a schematic view illustrating a pilot controlled parallel circuit control valve mechanism for governing operation of a pair of reversible fluid motors;

FIGURE 5 is a fragmentary schematic view illustrating a slight modification of the control mechanism of FIGURE 4;

Figure 1:
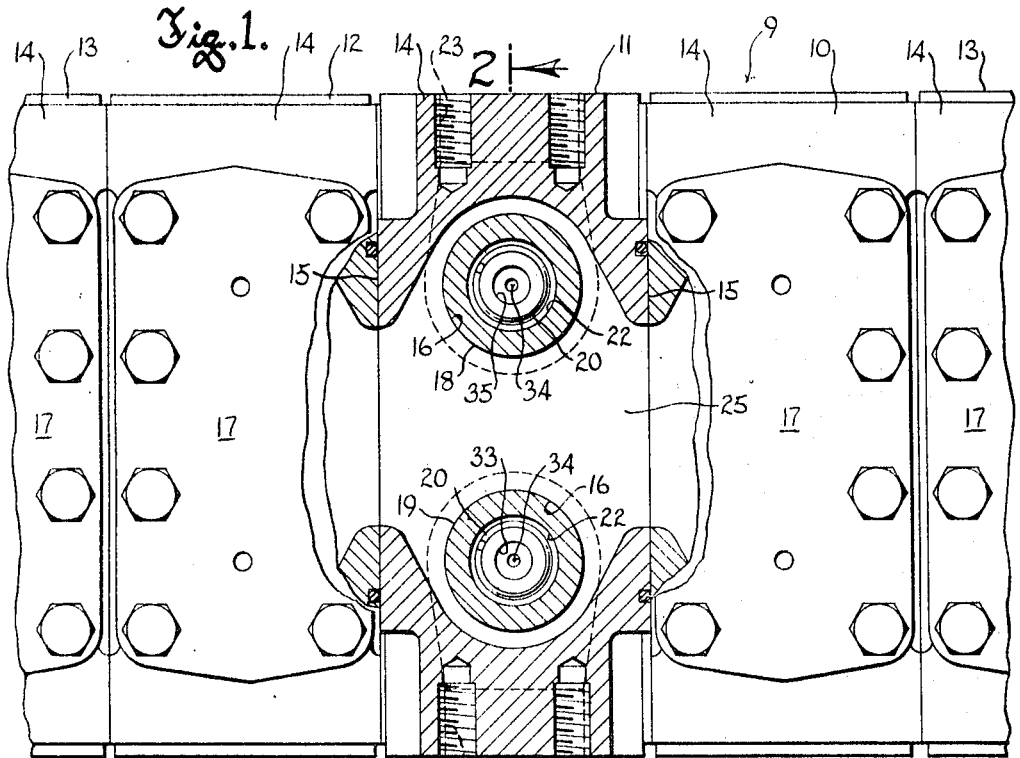
FIGURE 1 is a view partly in section and partly in elevation, of part of a valve bank comprised of valve sections each incorporating divided spool valve elements of this invention.

Referring now to the accompanying drawings, the numeral 9 in FIGURE 1 designates a divided spool control valve mechanism of this invention. The valve mechanism has been shown as comprising a plurality of identical individual valve units or sections 10, 11 and 12, stacked flatwise together and confined between end sections 13 to form a bank. It is to be understood, however, that the divided spool valve mechanism of this invention lends itself equally well to unit body construction, that is, where one valve body contains all of the valve spools necessary for controlling a plurality of fluid motors.

Each valve unit comprises a flat substantially rectangular block-like body section 14 having opposite flat faces 15 which are parallel to one another and adapted to have mating and sealing engagement with the flat faces on adjacent body sections. The junctions between adjacent sections can be made in accordance with the teachings of my Patent No. 3,133,559, issued May 19, 1964, in order to prevent leakage of fluid at said junctions. FIGURE 3 illustrates the essence of that leakproof joint as embodied in one face of each body section 14.

Figure 2:
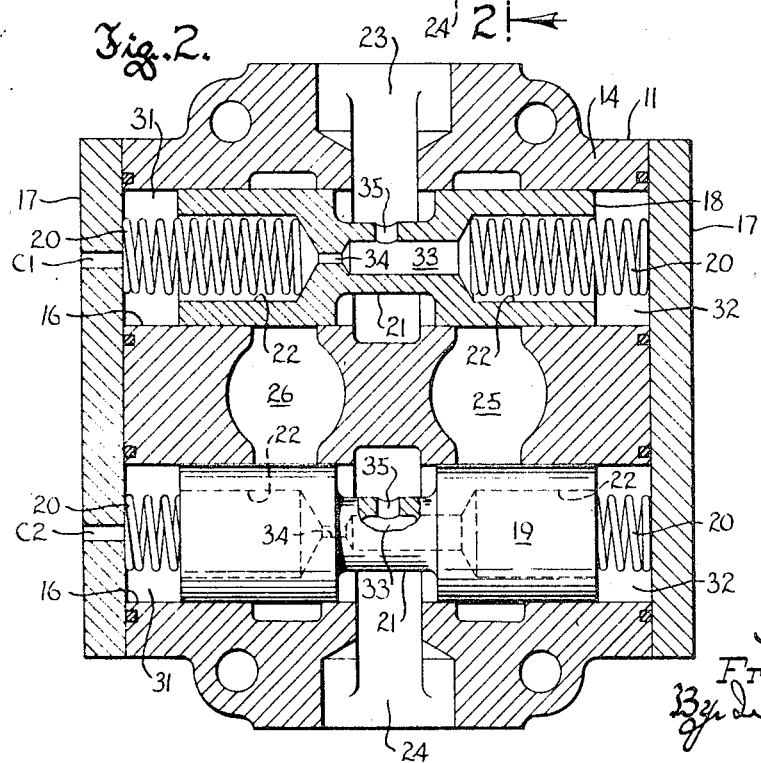
FIGURE 2 is a cross sectional view taken on the line 2—2 of FIGURE 1.

As seen best in FIGURE 2, each body section, when intended for the control of a reversible fluid motor, is provided with a pair of parallel spaced apart bores 16, the axes of which lie in a common plane parallel to and midway between the opposite faces 15 of the section. These bores extend entirely across the body section to be closed at their ends by covers 17 held in place on the opposite sides of the body section as by screws such as shown in FIGURE 1.

Each body section contains a pair of substantially short valve spools, 18 and 19, each axially slidably received in one of the bores 16. Each spool is adapted to control flow of pressure fluid to and from only one port of a fluid motor. Hence, it will be apparent that but one valve spool is needed for control of a single acting cylinder, while two separate but cooperating spools are needed for control of a double acting cylinder or other reversible fluid motor.

Each spool is movable from a neutral position, in which it is normally yieldingly held by centering springs 20, to operating positions at opposite sides of neutral. Each spool also has a medial circumferential groove 21 and cup-like hollow end portions 22 into which its centering springs project.

Service passages 23 and 24, opening laterally from the bores for spools 18 and 19, respectively, are formed as enlargements of the bores medially of their ends. These service passages are at all time in register with the groove 21 in the spools, and they are connectable with the ports of a reversible fluid motor to be controlled by the spools, as schematically shown in FIGURE 4. Supply and exhaust passages 25 and 26, respectively, each common to both bores 16, open laterally therefrom at opposite sides of the service passage enlargements, at zones opposite the cup-like end portion 22 of the valve spools.

At zones between the bores, the supply and exhaust passages 25 and 26 have portions that open to the opposite faces 15 of each body section, in register with those of an adjacent section, so as to provide carryover passage sections of supply and exhaust headers that extend through all of the body sections. One of the headers, of coure, communicates with an inlet 27 in one of the end sections of the bank thereof, and through which inlet it receives supply fluid from the outlet of a pump 28 (FIGURE 4). Similarly, the other header is communicable with a reservoir through a duct 29 (FIGURE 4) that may connect with an outlet in either end section of the bank.

Each valve spool is axially movable from its neutral position shown to first and second operating positions at opposite sides of neutral. In one operating position, the medial groove 21 in the spool communicates its service passage (23 or 24) with the supply passage 25. In its other operating position, the medial groove in the spool communicates its service passage with the exhaust passage 26. Hence, each pool controls fluid flow to and from one motor port connected with its service passage; from which it will be apparent that only one such spool is needed to control a single acting motor.

According to this invention, each bore 16 of a body section serves as a cylinder the opposite ends of which provide pressure chambers 31 and 32, and the valve spool therein provides a fluid pressure responsive plunger that is actuated into either pressure chamber of the cylinder, to one of its operating positions, in consequence of establishment of a predominating fluid pressure in the other pressure chamber. To provide for such actuation of the valve spools 18 and 19, their respective pressure chambers 31 which are adjacent to the exhaust passage 26, are provided with pilot control ports C1 and C2; the service passages 23–24 in the body section are at all times substantially unrestrictedly communicated with their repective pressure chambers 32; and the pressure chambers 31 and 32 of each bore are restrictively communicated with one another.

While there are various ways of effecting such communication between the service passages and the pressure chambers of each valve instrumentality, one very simple way is to employ a valve spool which is tubular. Hence, the hollow interior of each tubular valve spool can provide a passage 33 which communicates its pressure chambers 31 and 32 with one another through a restriction 34 in said passage, at the end thereof adjacent to chamber 31. Valve passages 33 also provide substantially unrestricted communication between service passages 23–24 and their respective pressure chambers 32, through radial holes 35 located in the walls of the medially grooved portions of the tubular valve spools and at all times in communication with the service passages associated therewith.

With this construction, it will be seen that if the control port (C1–C2) for either valve spool is closed, pressure fluid will be trapped and balanced in its chambers 31 and 32 and maintained therein at the cylinder pressure obtaining in the associated service passage 23 or 24. The equal pressure forces then acting on the opposite ends of the plunger provided by the valve spool allow the centering springs 20 to hold the spool in its neutral position at which the lands provided by the opposite cup-like end portions of the spool close off its service passage from both its supply and exhaust passages 25–26.

When it is desired to direct supply fluid to a fluid motor, through service passage 23 for instance, valve spool 18 is actuated to its first operating position communicating its service passage 23 with supply passage 25. This is accomplished by directing pressurized control fluid from pump 28 through port C1 into the pressure chamber 31 for spool 18. Because of the restriction 34 in the spool 18, a predominating pressure is then established in its chamber 31. Spool 18 responds to this predominating pressure in its chamber 31 and is moved to the right thereby to its first operating position communicating service passage 23 with supply passage 25.

If pressure fluid is allowed to exhaust from the chamber 31 for spool 18 through its control port C1, pressure fluid from service passage 23 can flow into axial passage 33 of the spool through radial port 35 in its wall to establish a predominating pressure in its chamber 32, due to the influence of restriction 34. The spool 18 responds to such predominating pressure in its chamber 32 and is moved to the left thereby, to its second working position venting service passage 23 to the exhaust passage 26. Consequently, return fluid in service passage 23 will flow into the exhaust header for return to the reservoir.

Flow of return fluid from service passage 23 to the exhaust passage 26 can be stopped whenever desired merely by blocking control port C1, whereupon the spool 18 will return to its neutral position in consequence of equalization of pressures in its chambers 31 and 32.

The above statement of operation is typical of the control which spool 18 provides for a single acting motor. When a reversible fluid motor such as a double acting hydraulic cylinder 37 (FIGURE 4) is to be controlled, the second valve spool 19 is cooperable with spool 18 to effect flow of pressure fluid to either port of the cylinder and to concurrently vent the other cylinder port to the reservoir. The operation of a divided spool valve mechanism for thus controlling a double acting cylinder 37 is schematically shown in FIGURE 4, to which specific reference will now be made.

The valve spools 18 and 19 are there schematically shown in axially opposed relation, and as though each were provided with its own supply and exhaust passages. The spools 18 and 19 will be in their neutral position shown when their respective control ports C1 and C2 are blocked. When pressurized control fluid from pump 28 is admitted to the chamber 31 of valve spool 18 through its control port C1, port C2 for valve spool 19 must be vented. Spool 18 will then be actuated to the right in response to predominating pressure in its chamber 31, to cause supply fluid to flow from passage 25 to service passage 23 and to the lower port M1 of cylinder 37 connecting with said service passage. This causes upward extension of the piston rod of cylinder 37. Pressure fluid expelled from the upper port M2 of the cylinder returns to serve passage 24 of spool 19, and flows unrestrictedly through passage 33 thereof into its chamber 32 to produce a predominating pressure therein by which spool 19 is moved to the right to its operating position venting service passage 24 to the exhaust passage 26.

Similarly, if pump fluid is admitted to control port C2 while control port C1 is vented, predominating pressures are established in chambers 32 and 31 of valve spools 18 and 19 respectively, to cause both spools to shift to operating positions at the left of neutral, to connect cylinder port M2 with the supply passage 25 and cylinder port M1 with the exhaust passage 26. This, of course, reverses the direction of operation of cylinder 37.

A second double acting cylinder, not shown, can be controlled by the spools of valve section 12 illustrated in FIGURE 4 in the same way as described above.

One of the outstanding features of the divided spool valve mechanism described, is that each of its spools is capable of serving as its own load drop check valve. For example, assuming the spool 18 to be in its right hand operating position in FIGURE 4, at which pump fluid can flow to service passage 23 and hence to the bottom end of the cylinder 37, spool 18 will immediately move toward neutral to close off its service passage 23 whenever pressure therein rises to a value above the pressure of pump fluid in the supply passage 25. It responds in this manner because of the fact that at such a time the pressure in its chamber 32 will also exceed the pressure of pump fluid in chamber 31 which, of course, will be equal to that of fluid in the supply passage. As soon as passage 23 is closed off, pressures in the chambers 31 and 32 equalize and spool 18 is caused to occupy its its neutral position in which it will remain until a difference in pressure is again produced in its chambers.

If desired, however, a normally closed check valve 38 can be used at the inlet 27 of the supply header in the manner indicated in FIGURE 5, to open whenever pressure of fluid at the inlet 27 exceeds the pressure of fluid in either service passage 23 or 24 that may be then communicated therewith. The advantages of such a check valve will be discussed hereinafter.

Another important feature of the valve mechanism is that the spools thereof can be produced without critical regard for "land timing." In conventional spool type valves, the lands on the spool are so "timed" with respect to the locations of the supply, exhaust and service passages, as to assure that one end of the governed cylinder will be vented slightly before supply fluid is fed into its other end. Such timing is not essential with the divided spool valves of this invention, wherein each spool is actuated solely in response to differences in pressure in its chambers 31 and 32, and wherein the pressures in said chambers can be influenced by pressure conditions in the service passage associated therewith.

In addition to its above described motor reversing functions, the control valve mechanism 11 comprising valve spools 18 and 19 can also achieve high pressure regenerative operation of the cylinder 37, as well as float, if desired. High pressure regeneration effects rapid extension of the piston rod of cylinder 37, or high speed raise; while float effects venting of any pressure in the work cylinder and is popularly resorted to for effecting rapid lowering of a load connected to its piston rod.

High pressure regeneration or rapid lift is achieved by admitting pressurized control fluid from pump 28 to the chambers 31 of both valve spools 18 and 19, through their respective pilot ports C1 and C2. As seen best in FIGURE 4, this will cause the spools to move to positions concurrently communicating their service passages 23–24 with the supply passage 25, so as to connect motor ports M1 and M2 with one another through the valve mechanism. Though the same pressure will then obtain in both ends of cylinder 37, its piston will nevertheless be moved upwardly to lift a load carried by its rod, due to the greater area of the piston exposed to the pressure of supply fluid in the lower end of the cylinder. Fluid expelled from the upper motor port M2 returns to service passage 24 and flows to the supply passage 25 then communicated therewith, and such return fluid joins the flow of pump fluid flowing through service passage 23 to motor port M1. Hence, motor port M1 receives supply fluid from the pump together with exhaust fluid from motor port M2, and the piston rod of cylinder 11 will be extended at a substantially rapid rate.

Movement of spool 19 to its high pressure regeneration or rapid lift position described above, however, requires that its chamber 32 be vented to the supply passage 25. This can be readily accomplished in some cases by a check valve controlled duct that either connects the service passage 24 with the supply passage, or as shown in FIGURE 4, by a duct 42 connecting the chamber 32 for spool 19 with the supply passage 25, and containing a check valve 42'.

Float and/or rapid lowering of the load on the cylinder is achieved by venting both control ports C1–C2. This allows both spools 18 and 19 to assume their neutral positions shown, from which either spool can be shifted to an exhaust position in response to expulsion of fluid from its associated cylinder port under load forces acting upon the piston rod of cylinder 37.

For example, if the substantially heavy boom structure of a front end loader or the like comprises the load on the cylinder, it can be lowered rapidly under its own weight by concurrently venting both control ports C1 and C2. When this occurs, pressure fluid expelled from motor port M1 at the bottom of the cylinder flows to service passage 23, and from thence to passage 33 in spool 18, to produce a predominating pressure in the chamber 32 thereof. The spool 18 responds to such predominating pressure in its chamber 32 and is moved to the left thereby to communicate its service passage 23 with the exhaust passage 26.

Normally, fluid thus exhausting from motor port M1 would then flow to the reservoir, as through the duct 29 seen in FIGURE 4. However, a restriction means, here shown by way of example as a spring biased low pressure relief valve 39, is provided in the exhaust header adjacent to its outlet, to cause pressure of return fluid from cylinder port M1 to build up to a value sufficient to unseat a void control check valve 40 governing a bypass 41 between service passage 24 of valve spool 19 and the exhaust passage 26. Consequently exhaust fluid expelled from motor port M1 in the float position of the valve spools is pressurized in the exhaust header and then returned to the expanding upper end of cylinder 37 through the bypass 41, check valve 40, service passage 24 and motor port M2 connecting therewith.

A similar bypass 41 and check valve 40 governing the same can be provided for valve spool 18, to cause pressurized fluid to flow to the large volume end of cylinder 37 if the latter end expand under the influence of a load connected to the piston rod of the cylinder.

From the above, it will be seen that the low pressure relief valve 39 and check valve 40 provide assurance against drawing voids in either end of the cylinder 37 during float operation of the cylinder as well as during normal operation thereof, as for instance during lowering of a heavy load under power.

A pilot valve P1 such as seen in FIGURE 4, can be employed to govern actuation of valve spools 18 and 19. The pilot valve can be provided by a conventional open center spool type control valve, preferably in one of the smaller sizes thereof. Pump fluid entering its inlet 43 normally flows through an open center passage in the pilot to an outlet header 44 for return to the reservoir. Such flow through the open center passage is blocked when the spool 45 of the pilot is shifted in either direction out of its neutral position shown, to one or the other of a pair of defined operating positions displaced predetermined distances at opposite sides of neutral. As is customary, the spool 45 is thus adapted to communicate either service passage 46 or 47 of the pilot with the inlet and the other service passage with the outlet through one or the other of a pair of exhaust passage branches 48 leading to the outlet header 44.

Pilot service passage 46 can be connected to control port C1 for valve spool 18, while the other pilot service passage 47 can be connected to control port C2 for valve spool 19. Accordingly, shifting of the pilot spool a first distance to the right of neutral not only diverts pump fluid entering its inlet to pilot service passage 46 and hence to control port C1 connected therewith, but it also causes control port C2 to be vented to the reservoir through pilot service passage 47 connected therewith. This results in actuation of spools 18 and 19 to effect extension of the piston rod of cylinder 37 in the manner described previously.

Shifting of the pilot spool a first distance to the left of neutral reverses these connections of pilot service passages 46 and 47 with the pump and reservoir, to effect retraction of the piston rod of cylinder 37 in consequence of pressurization of control port C2 concurrently with venting of control port C1.

Obviously, if cylinder 37 were of the single acting type, only one valve spool, such as the spool 18, would be required, and the service passage 47 of the pilot valve would be plugged in the usual manner. In that case, the pilot spool could be a conventional single acting spool with fewer lands.

A fluid pressure operated system incorporating divided spool valves of this invention can also advantageously employ a speed control unit 49, such as seen in FIGURE 4. The speed control unit operates in a manner fully described in my Reissue Patent No. Re. 26,028 granted May 17, 1966, and it may be considered a metering type bypass valve by which the pump 28 is unloaded at times when the pilot valve and the valve spools 18 and 19 are in their neutral positions. It comprises a pressure responsive valve plunger 50 which is spring biased toward a closed position blocking fluid flow from the pump outlet through a bypass 51 to the reservoir duct 29. It opens in response to pressure of pump output fluid on its front 52, and it moves toward bypass closing position in response to increase in pressure at the pilot valve.

The valve plunger 50 is capable of occupying any of a number of positions intermediate its open and closed positions to meter the amount of pump output fluid being bypassed to the reservoir, which intermediate positions it assumes depending upon the extent the pilot spool 45 restricts fluid flow through the open center passage of the pilot. The valve plunger 50 of course, completely closes the bypass 51 whenever the pilot spool closes off flow through the open center passage in the pilot valve.

Such response of the valve plunger 50 to pressure at the pilot inlet is achieved by communicating the latter with the chamber 54 in which the plunger operates; and if desired, the plunger can have a passage 55 through its front leading to chamber 54 to supply the pilot valve with pump fluid therefrom as shown.

As indicated, the pilot spool 45 can be grooved to provide float and high pressure regenerative positions that are effective when the spool is displaced greater distances to opposite sides of neutral. In its float position, the spool of the pilot effects concurrent venting of both of its service passages 46 and 47 to allow the valve spools 18 and 19 to respond freely to load forces on the cylinder 37. In its high pressure regenerative position, the spool of the pilot effects concurrent pressurization of control ports C1 and C2, as described earlier.

As in conventional control valves, the pilot valve is provided with high pressure relief valve mechanism which opens whenever pressure in the system rises to a predetermined relief value. Opening of the relief valve mechanism, of course, effects venting of either control port C1 or C2 that may have been receiving control fluid from the pilot service passage connecting therewith. If port C1 were thus vented, for example, the valve spool 18 would immediately shift to its exhaust position to vent service passage 23 in response to the over pressure therein and in chamber 32 communicating therewith.

Though each spool of the valve mechanism of this invention can serve as its own check valve, as described earlier, there are times when it can be highly desirable to additionally employ therewith the inlet check valve 38 mentioned before. The check valve 38 can then serve as a fast closing check to supplement the check valve action of the valve spools, since shifting of the latter toward their neutral positions by back pressure in their service passages requires a small but given increment of time.

Also, when a suitably strong biasing spring is provided for check valve 38, the latter can serve as a low pressure relief valve to maintain a pilot pressure greater than the pump pressure in the supply passage 25. This will assure against hunting of either valve spool 18 or 19 under certain conditions.

Check valve 38, if biased closed by a spring of suitable strength, will maintain the desired high pump and pilot pressure regardless of any low pressure condition in the cylinder at the time it is communicated with one or the other of the service passages 23–24 of the valve mechanism.

The second pair of valve spools 18 and 19 of valve mechanism 12 shown in FIGURE 4 are connected in parallel with the spools of valve mechanism 11, and are adapted to be governed by a pilot valve which may be identical with the pivot valve for valve mechanism 11, or by one which does not necessarily provide for float or high pressure regeneration.

Suggestive of the versatility of the valve mechanism of this invention is the fact that any two valve spools shown in FIGURE 4, or in a bank of such spools, can have their service passage communicated with the ports of a double acting cylinder to control the same, provided the control ports of the selected valve spools are properly connected with the service passages of the same pilot valve. This versatility of the valve mechanism can often facilitate and simplify the control and service connections in many fluid pressure operated systems.

The valve spools of each of the valve mechanisms illustrated in FIGURE 4 will faithfully obey the commands of their respective pilot valves even to the extent that the lands on the pilot spool are "timed" to vent one of its service passages to the exhaust passage slightly before it opens its other service passage to the pilot inlet. Thus, for example, when the spool of the pilot valve for valve unit 11 is moved to its operating position effecting retraction of the piston rod of cylinder 37, it first vents the pilot service passage connected with control port C1 so that the valve spool 18 immediately moves to its exhaust position. Substantially directly thereafter, the pilot spool effects delivery of control fluid to control port C2 of spool 19 to cause the latter to shift to its feed position at which supply fluid from the pump flows to the upper end of the cylinder.

An exception to the above would be where the pressure in the upper end of cylinder 37 was substantially low at the time spool 18 was actuated to feed supply fluid to the bottom end of the cylinder. Spool 19 would not then immediately respond to the command of the pilot valve, but would shift to its exhaust position only after pressure in the top of the cylinder increased to the value necessary to establish a predominanting pressure in chamber 32 for spool 19. Hence, under these conditions, the spools 18 and 19 more or less serve as counterbalancing function.

Figure 6:
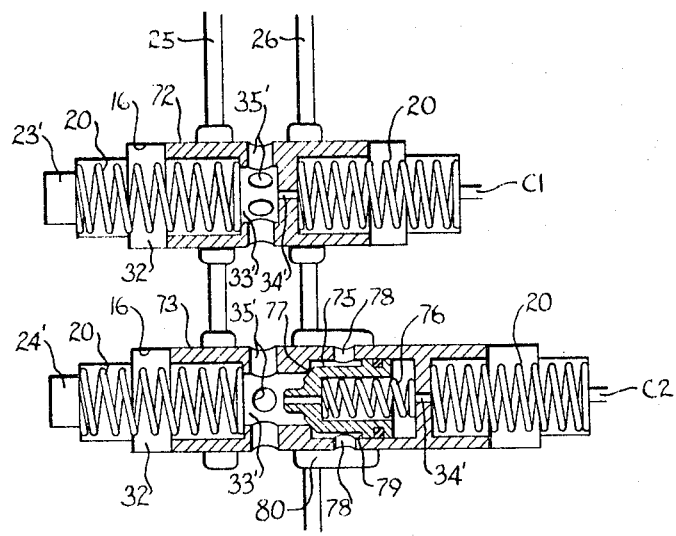
FIGURE 6 is a fragmentary schematic view illustrating modified versions of divided spools such as seen in FIGURE 4.

FIGURE 6 schematically shows a valve mechanism comprising two valve spools 72 and 73 which are constructed somewhat differently than the spools 18 and 19, but which will function in the same way to control either one double acting cylinder or two single acting cylinders. Control ports C1 and C2 are similarly provided for the spools 72 and 73, respectively, when they are intended to control a double acting cylinder at the dictate of the same pilot valve. While their supply and exhaust passages 25 and 26, respectively, remain substantially the same as before, their respective service passages 23' and 24' are located at one end of the spool bores 16, in direct communication with their chambers 32.

The spool 72, through tubular, is even shorter than the spools 18, 19 described previously, It differs therefrom primarily in that it has a uniform diameter and a series of radial holes 35' in its wall at a location medially of its ends. The holes 35' open inwardly to the axial passage 33' in the interior of the spool, and they are disposed midway between the supply and exhaust passages 25 and 26 in the neutral position of the spool shown. Hence, spool 72 can be caused to move to the left in response to pressure of control fluid admitted to its chamber 31 through port C1, to a feed position at which its holes 35' communicate the supply passage 25 with the service passage 23'. The restriction 34' again produced the predominating pressure in chamber 31 by which the spool is shifted to its feed position when its control port C1 is pressurized. The spool 72, of course, moves to its vent position at which its holes 35' communicate service passage 23' with the exhaust passage 26 when the control port C1 is vented. It does so in response to predominating pressure in its chamber 32, which will reflect the pressure at the motor port connected with service passage 23'. When the control port C1 is blocked, the fluid pressures in chambers 31 and 32 become equal, and the centering springs act on the spool to yieldingly hold it in its neutral position.

Spool 73 is ideally suited for the control of fluid flow to and from that end of a double acting cylinder in which cavitation is likely to occur. It is generally like the spool 72, but is made sufficiently longer so as to be able to accommodate a void control check valve 75 in its interior, at a location axially between the series of radial holes 35' and the restriction 34'. The check valve 75 is tubular, and it is yieldingly biased by a spring 76 toward a closed position engaging a seat 77 in the interior of the spool. The seat 77 faces axially away from the radial holes 35' and is disposed between them and a second series of radial holes 78 in the wall of the tubular spool 73. The last mentioned holes open to a space around the exterior of the check valve 75 at a location between the seat 77 and an external shoulder 79 on the valve slidably and sealingly engaged with the inner wall of the tubular spool.

The exhaust passage 26 is widened as at 80 at its junction with the bore for spool 73, so as to assure that the holes 78 will register therewith in at least the neutral and feed positions of the spool. Consequently, if pressure of fluid in the service passage 24' drops to a low enough value indicating that there is danger of a void forming in the end of the cylinder connected therewith, load pressurized fluid will be present in the exhaust passage 26 and it can act upon the external shoulder 79 of valve 75 to cause it to open and thereby allow such load pressurized fluid to flow to the service passage through the axial passage 33' in the spool 73, for void relief.

Figure 7:
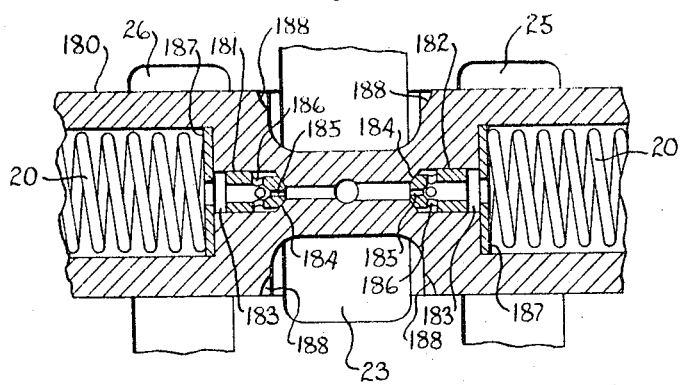
FIGURE 7 illustrates a divided spool valve element equipped with damping devices.

FIGURE 7 illustrates a slight modification of the basic valve spool that can be used to advantage under certain conditions to prevent unwanted response of the spool to pressure in its service passage, particularly at times when the spool is in an operating position. As therein seen, the valve spool 180 is provided with a pair of tubular valve-like damping plungers 181 and 182 which serve to effert substantial reduction in the pressure of fluid flowing to the pressure chambers at the ends of the spool from its service passage 23 (or 24).

The plungers 181 and 182 are axially slidably mounted in chambers 183 that are coaxial with the spool and open outwardly from the axial passage in the valve spool through the bottoms of its cup-like ends. The bottom of each chamber 183 is shaped to provide a conically surfaced annular seat 184 with which a nose on its plunger engages in response to predominating pressure in its adjacent pressure chamber (31 or 32) to constrain fluid in said chamber to flow toward the opposite chamber through an orifice 185 in the nose of the plunger.

The orifices substantially correspond in function to the restrictions 34 described hereinbefore. However, it will be noted that when either plunger is seated by predominating fluid pressure in its adjacent pressure chamber, the other plunger will be unseated to provide somewhat less restricted flow of fluid therepast, around the reduced seat engaging end portion of the plunger and through radial holes 186 therein and the larger diameter interior of the tubular plunger to the adjacent pressure chamber (31 or 32).

Washers 187 held by the centering springs 20 against the bottoms of the wells defined by the cup-like end portions of the valve spool, serve to limit movement of the plungers 181 and 182 off of their seats 184.

The damping plungers are especially useful in a metering position of the valve spool, to which it can be moved in response to setting of the pilot spool therefor in a corresponding metering position. A metering position such as referred to, for example, can be one where the service passage 23 receives pressure fluid from the supply passage 25 only through metering notches 188 in the spool. In the absence of the damping plungers 181 and 182 at such a time, any flunctuation in pressure in the service passage 23 could lead to hunting of the valve spool such as would alternately increase supply flow to service passage 23 upon drop in pressure in the latter, and to decrease or even close off flow of supply fluid to service passage 23 upon rise in pressure therein. The plungers 181 and 182, however, have an attenuating action which substantially cancels out the effects upon the valve spool of pressure fluctuations in service passage 23 (or 24).

From the foregoing description, together with the accompanying drawings, it will be apparent to those skilled in the art that this invention provides improved pilot controllable valve mechanism featuring divided spool valve elements, and which mechanism is far simpler and easier to produce, at less cost, than conventional spool valve mechanisms.

What is claimed as my invention is:

1. A control valve instrumentality having a pair of pressure chambers, and fluid pressure responsive valve means actuatable to a feed position communicating a service passage with a supply passage in response to flow of pressure fluid into one of said chambers, and actuatable to a vent position communicating the service passage with an exhaust passage in response to flow of pressure fluid into the other chamber, said control valve instrumentality being characterized by:
   (A) passage means affording restricted communication between the service passage and a first one of said chambers;
   (B) passage means by which pressure fluid can be admitted to the second chamber from the service passage;
   (C) and a control port communicating with said first chamber.

2. A control valve instrumentality having a pair of pressure chambers, and fluid pressure responsive valve means actuatable to a feed position communicating a service passage with a supply passage in response to flow of pressure fluid into one of said chambers, and actuatable to a vent position communicating the service passage with an exhaust passage in response to flow of pressure fluid into the other chamber, said control valve instrumentality being characterized by:
   (A) control port communicating with a first one of said chambers;
   (B) passage means providing restricted communication between said chambers;
   (C) and passage means providing a fluid flow path communicating the second chamber with the service passage.

3. The control valve instrumentality of claim 2, further characterized by
   (A) said valve means having a normal position at which it closes off communication of the service passage with both the supply and exhaust passages;
   (B) and biasing means acting upon the valve means and rendered effective to return the same to its normal position at times when the control port is closed and fluid is trapped in said chambers at a pressure corresponding to that in the service passage.

4. The control valve instrumentality of claim 3, wherein said valve means is actuatable to feed and vent positions at opposite sides of its normal position.

5. The control valve instrumentality of claim 4, wherein said first chamber is communicated with the service passage and with the second chamber through common restriction means.

6. The control valve instrumentality of claim 5, further characterized by:
(A) the valve means comprising an elongated valve element which is axially slidable in a bore toward and from its feed and vent positions;
(B) and said pressure chambers being provided by opposite end portions of the bore.

7. The control valve instrumentality of claim 6, wherein said chambers are communicated with one another through a passageway extending axially through the valve element and having said restriction means therein.

8. The control valve instrumentality of claim 7, further characterized by:
(A) said valve element being tubular so that its hollow interior provides said passageway communicating the chambers;
(B) said supply and exhaust passages opening laterally from the bore;
(C) and said tubular valve element having radial port means in its wall at all times communicating with the service passage and located to be selectively communicated with either the supply passage or the exhaust passage in the feed and vent positions, respectively, of the valve element.

9. The control valve instrumentality of claim 8, further characterized by:
(A) said service passage opening laterally from the bore at a location intermediate the supply and exhaust passages;
(B) and said service passage being communicated with said pressure chambers through said radial port means.

10. The control valve instrumentality of claim 8, wherein said service passage is located at one end of the bore and opens directly to said second pressure chamber to be communicable with the supply and exhaust passages through said radial port means.

11. The control valve instrumentality of claim 8, further characterized by:
(A) said tubular valve element having other radial port means in its wall located intermediate said first designated radial port means and the restriction means and to be in register with the exhaust passage in at least said feed position of the valve element;
(B) and a hollow void control valve mechanism in the interior of the valve element arranged to normally close off communication of the service passage with said other radial port means and to open in response to pressure of fluid in the exhaust passage at a value exceeding the pressure of fluid in said first pressure chamber to allow fluid to flow to the service passage from the exhaust passage.

12. The control valve instrumentality of claim 4, further characterized by pilot means connected with said control port to control fluid flow therethrough.

13. A control valve instrumentality of the type wherein predominating pressure in either of a pair of pressure chambers effects actuation of a valve element out of a spring biased neutral position to one or the other of a pair of operating positions at opposite sides of neutral to selectively communicate a service passage with either a pressure fluid supply passage or with an exhaust passage, said control valve instrumentality being characterized by:
(A) means providing substantially unrestricted communication between the service passage and one of said chambers;
(B) means providing restricted communication between said chambers so that when fluid is trapped in both of them, pressures therein will be equal and the valve element will be held in its spring biased neutral position, and so that said predominating pressure can be produced in said one chamber in consequence of flow thereinto of pressure fluid from the service passage provided fluid can be exhausted from the other chamber;
(C) and a port providing for admission of pressure fluid to and exhaust of fluid from the other chamber.

14. A control valve instrumentality having a body with a valve plunger slidable axially in a bore the opposite ends of which terminate in a pair of actuating chambers which, when pressure fluid is selectively admitted thereto, effect actuation of the plunger from a neutral position to feed or vent positions at opposite sides of neutral to respectively communicate a service passage with either a supply passage or an exhaust passage, said instrumentality being characterized by:
(A) a pilot controllable port for one of said chambers;
(B) means providing a passageway communicating the other chamber with the service passage;
(C) and passage means providing restricted communication between said chambers.

15. The control valve instrumentality of claim 14, further characterized by:
(A) said valve plunger having a cup-like end portion at each end opening to the adjacent chamber;
(B) and a return spring in each chamber, extending into the interior of the adjacent cup-like end portion of the plunger, said springs yieldingly holding the plunger in neutral position.

16. The control valve instrumentality of claim 15, further characterized by:
(A) said valve plunger having a uniform diameter throughout its length;
(B) and said passageway comprising a hollow portion on the plunger, and radial ports opening through the side of the plunger at a distance from said other chamber.

17. The control valve instrumentality of claim 14, further characterized by:
(A) said plunger being hollow throughout its length so that said chambers are communicated with one another through its interior;
(B) a radial port in the plunger by which said other chamber is communicated with the service passage through the interior of the plunger;
(C) and restriction means in the interior of the plunger located intermediate said radial port and said one chamber.

18. The control valve instrumentality of claim 17, wherein a second restriction means is incorporated in the interior of the plunger intermediate said radial port and the other chamber.

19. The control valve instrumentality of claim 18, wherein said restriction means comprises a pair of valve like damping plungers, one for each chamber and maintained seated in response to fluid pressure in its associated chamber at a value exceeding that which obtains at said radial port, and adapted to be unseated to a less restricting position in response to fluid pressure in its associated chamber at a value less than that which obtains at said radial port.

References Cited
UNITED STATES PATENTS

| | | | |
|---|---|---|---|
| 2,933,105 | 4/1960 | Jerman | 137—596.18 XR |
| 3,230,841 | 1/1966 | York | 137—596.18 XR |
| 3,402,736 | 9/1968 | Trick | 137—596.12 |

HENRY T. KLINKSIEK, Primary Examiner

U.S. Cl. X.R.

137—596.18, 596.2